(12) United States Patent
Riegler

(10) Patent No.: US 10,174,470 B2
(45) Date of Patent: Jan. 8, 2019

(54) ELECTRICALLY CONDUCTIVE CARRIAGEWAY MARKING

(71) Applicant: LUCOBIT AG, Wesseling (DE)

(72) Inventor: Robert Riegler, Böhl-Iggelheim (DE)

(73) Assignee: Lucobit AG, Wesseling (DE)

( * ) Notice: Subject to any disclaimer, the term of this patent is extended or adjusted under 35 U.S.C. 154(b) by 0 days.

(21) Appl. No.: 15/746,478

(22) PCT Filed: Jul. 22, 2016

(86) PCT No.: PCT/EP2016/067595
§ 371 (c)(1),
(2) Date: Jan. 22, 2018

(87) PCT Pub. No.: WO2017/017040
PCT Pub. Date: Feb. 2, 2017

(65) Prior Publication Data
US 2018/0209107 A1 Jul. 26, 2018

(30) Foreign Application Priority Data
Jul. 24, 2015 (EP) ..................................... 15178356

(51) Int. Cl.
*E01F 11/00* (2006.01)
*E01F 9/576* (2016.01)
(Continued)

(52) U.S. Cl.
CPC ............... *E01F 11/00* (2013.01); *E01F 9/20* (2016.02); *E01F 9/30* (2016.02); *E01F 9/578* (2016.02);
(Continued)

(58) Field of Classification Search
CPC ..... E01F 9/20; E01F 9/30; E01F 9/578; E01F 9/582; E01F 9/617; E01F 11/00;
(Continued)

(56) References Cited

U.S. PATENT DOCUMENTS 3,585,585 A * 6/1971 Grosz ...................... G08B 5/36
340/321
3,836,275 A 9/1974 Finch
(Continued)

FOREIGN PATENT DOCUMENTS

WO 2013017410 A1 2/2013

OTHER PUBLICATIONS

International Search Report and Written Opinion for PCT/EP2016/067595 dated Nov. 15, 2016 (11 pages; with English translation).
(Continued)

*Primary Examiner* — Raymond W Addie
(74) *Attorney, Agent, or Firm* — Bejin Bieneman PLC

(57) ABSTRACT

An electrically conductive carriageway marking includes a carrier strip, electrically conductive wires extending along the carrier strip, an electrically insulating covering layer covering the wires, a power feed formed by an interface connecting the wires to a supply line, and interfaces arranged spaced apart from each other along the carriageway marking and having electrical contact areas. The contact areas include contact elements protruding laterally from the carriageway marking, and the supply line is connectable to a first contact area of the wires and a second contact area of the wires by electrical contacts that can be tapped off. In the region of the contact areas the covering layer is formed by a detachable adhesive protective strip, and the protective strip is connected via predetermined break points or perforations to adjoining sections of the covering layer, and the wires are exposed by detaching the protective strip.

16 Claims, 2 Drawing Sheets

(51) Int. Cl.
| | |
|---|---|
| *E01F 9/582* | (2016.01) |
| *E01F 9/20* | (2016.01) |
| *E01F 9/30* | (2016.01) |
| *F21S 8/00* | (2006.01) |
| *G01L 1/16* | (2006.01) |
| *E01F 9/615* | (2016.01) |
| *F21Y 115/10* | (2016.01) |
| *F21S 10/02* | (2006.01) |
| *F21S 10/06* | (2006.01) |
| *F21W 111/02* | (2006.01) |

(52) U.S. Cl.
CPC .............. *E01F 9/582* (2016.02); *F21S 8/032* (2013.01); *G01L 1/16* (2013.01); *E01F 9/617* (2016.02); *F21S 10/02* (2013.01); *F21S 10/06* (2013.01); *F21W 2111/02* (2013.01); *F21Y 2115/10* (2016.08)

(58) Field of Classification Search
CPC ............ F21S 8/032; F21S 10/02; F21S 10/06; F21W 2111/02; F21Y 2115/10; G01L 1/16

USPC ............................................ 404/9, 12–4, 94
See application file for complete search history.

(56) References Cited

U.S. PATENT DOCUMENTS

| | | | |
|---|---|---|---|
| 3,846,672 A | | 11/1974 | Doughty |
| 3,996,556 A | | 12/1976 | Eigenmann |
| 4,050,834 A | * | 9/1977 | Lee ........................... F21S 9/02 |
| | | | 359/547 |
| 4,080,085 A | * | 3/1978 | Dickson ................. E01F 9/582 |
| | | | 362/235 |
| 4,428,990 A | | 1/1984 | Edwards |
| 4,993,868 A | * | 2/1991 | Eigenmann ............ G08B 19/02 |
| | | | 374/E11.022 |
| 2007/0217864 A1 | * | 9/2007 | Yang ...................... E01F 9/582 |
| | | | 404/12 |

OTHER PUBLICATIONS

International Preliminary Report on Patentability for PCT/EP2016/067595 dated Feb. 8, 2018 (8 pages).

\* cited by examiner

ELECTRICALLY CONDUCTIVE CARRIAGEWAY MARKING

CROSS-REFERENCE TO RELATED APPLICATIONS

This application is a national stage of, and claims priority to, Patent Cooperation Treaty Application No. PCT/EP2016/067595, filed on Jul. 22, 2016, which application claims priority to European Application No. EP15178356.0, filed on Jul. 24, 2015, which applications are hereby incorporated herein by reference in their entireties.

BACKGROUND

Electrically conductive carriageway markings are known from WO 201 301 741 0 A1. This carriageway marking has a layer structure which is applied to the carriageway. For this purpose, a channel is milled into the carriageway, which receives the carriageway marking. The layer structure used here consists of a carrier layer, under which a protective layer and an adhesive layer are arranged. On the carrier layer two electrically conductive layers are arranged on top of each other, one as a return electrode and the other as a front electrode. Underneath the front electrode a light-limiting layer is provided, wherein the light imitated thereby can shine through the transparent front electrode and a multi-layered, transparent covering layer. The front electrode and the return electrode supply the light-limiting layer with the necessary voltage and are connected to an AC power source.

The known carriageway marking has the disadvantage that it can only be used for illuminating the covering layer and other electrical consumers cannot be connected to it. Another disadvantage is that, due to the complex layered structure the channel must be let into the carriageway, which not only involves additional effort but also damages the carriageway. Thus, for example, whenever the carriageway marking needs to be changed and a marking must be removed, the channel needs to be refilled.

U.S. Pat. No. 3,836,275 A1 discloses a system for carriageway marking, in which to provide improved visibility at night or in the rain, light-emitting elements, in particular light-emitting diodes, are used. To achieve this, a channel is laid in the carriageway, into which a prefabricated strip is inserted, which has pocket-shaped recesses spaced apart from each other, into which the light emitting elements are inserted. Electrical conductors running through the strip are exposed at the opposite edges of the recesses, so that they come into contact with corresponding contacts of the light-emitting elements when inserted into the recess. However, this system has the same disadvantages as those previously described in WO 201 301 741 0 A1.

SUMMARY

The electrically conductive carriageway marking disclosed herein can be laid in a simple way and is as universally applicable as possible. A road as described herein can be easily equipped with sensors or lighting elements.

The carriageway may be designed in the form of a film and has a thickness of less than 5 mm. The thickness may be less than 2 mm, so that an elastically constructed carriageway marking can be glued onto the carriageway without grooves having to be first gouged into the surface of the carriageway and without the carriageway marking being raised too far. Grooves have the disadvantage that the carriageway is damaged and, if the carriageway marking has to be removed, the corresponding depressions remain or must be refilled in a time-consuming process. A highly raised, thick carriageway marking has the disadvantage that it can affect the steering of vehicles, which approach the carriageway tangentially, and that jolts occur when driving over the carriageway marking. On the other hand, a certain thickness can be highly desirable to allow the driver to realize that he or she is crossing a marking.

In one example of the carriageway marking, the wires are arranged next to each other on the carrier strip and running along the carrier strip, and in order to form the contact areas the covering layer has sections that are detachably connected to the lower part of the carriageway marking, wherein by partial removal of the covering layer in the region of the contacting area, at least one of the wires can be at least partially exposed for contacting.

A conductor is created, which forms a carriageway marking at the same time. This conductor can be a current-carrying supply line or a data line, or a combination thereof. The number of the wires arranged parallel to each other, which are formed by the wire cores, is almost unlimited. Since depending on the voltage and the current magnitude, a width of one to a few millimeters is sufficient for carrying power and for data transmission, in the typically approximately 100 mm wide carriageway marking a plurality of wires can be laid next to each other, and preferably extend parallel to each other. In addition, it is possible to arrange the wires on top of each other in bundles.

The basic structure of a carriageway marking as described herein includes the carrier strip, which can be glued onto a carriageway. A durable, elastic adhesive is preferably used for this purpose. The wires are then applied to this carrier strip, either directly or indirectly. These wires are designed to be electrically conductive, and are therefore made of a conductive material that can be glued on or printed on. For example, foil strips or metal particles applied by screen printing can be used. An advantage of the structure is that it allows continuous production.

An insulation layer can be provided between the two wires, which is useful if the wires have a certain thickness. In this case, the insulation layer can have the same thickness, so that it forms a smooth surface together with external insulation layers and the wires. The covering layer is then applied to this partially electrically conductive intermediate layer.

The covering layer is essentially unrestricted in terms of its structure, but does not need to be multi-layered. The covering layer can be made of a light-reflecting material. A multi-layered structure can include, for example, an adhesive base layer with a functional layer laminated thereon, which is designed to be reflecting.

The carriageway marking has contact areas, via which the electrical signal or the applied voltage can be tapped, or else current or signals can be coupled in. For this purpose, the covering layer is designed such that it can be at least partially removed in the region of the contact areas to expose the wires.

While, for example between the contact areas, the covering layer can be permanently connected to the underlying region of the carriageway marking that carries the wires, in the region of the contact areas the covering layer can be detachable. For example, the underside of the respective region of the covering layer can be coated with removable adhesive in the manner of a detachable adhesive label.

The carriageway marking may have contacting areas at fixed intervals relative to each other, and these contact areas are covered by an adhesive protective strip that can be peeled off. This can be connected to the adjacent parts of the covering layer via perforations or predetermined breaking points or predetermined tearing points. As long as the electrical insulation of the underlying wires from the environment is ensured, this is not an essential prerequisite, however.

If the signal of the wires is to be tapped, the adhesive tape is removed from the not yet laid or already laid carriageway marking, causing the wires to be exposed. For example, instead of the protective strip a contact element can now be arranged on the carriageway marking. This is preferably also adhesive, so that it can be easily glued onto the free gap in the covering layer instead of the protective strip.

The contact element can have, for example, two contact areas located on its underside that are electrically conductive, and when sticking or otherwise applying the contact element onto the exposed section of the carriageway marking, abut against the exposed wires. In one possible configuration, the contact element can have a connection lead that leads away from the contact element and can be connected via, for example, the electrical consumers or else data processing devices. The actual connection lead is in turn connected to the contact areas via conductor tracks, so that the contact element produces the electrical connection between the connection lead and the wires.

The carriageway marking may be used for the control and supply of traffic warning beacons in the area of a construction site. Here, for example, two wires can be provided next to each other, so that the contact element is able to supply the lighting elements of the warning beacon with current via the connection lead. In this case, therefore, one of the wires acts as a phase and the other wire as a neutral conductor. If an additional data line is provided, an activation and/or deactivation signal can additionally be transmitted and picked up. To this end, either the contact element or the connected electrical consumer, in the example described above, the warning beacon, will then have a corresponding circuit that is able to evaluate the control signal. Alternatively, this control signal can also be modulated on the live conductor.

The contact areas may be provided at equal intervals to each other within the covering layer. This may occur, for example, every 100 cm. Ultimately, however, it depends on the application of the carriageway marking, such as on the number and function of the devices to be connected.

The carriageway marking can thus be used exclusively for supplying lighting elements with electrical voltage. In this case, it will be sufficient if the contact areas have the same spacing as lighting elements usually have between them. In the construction site field, this would be, for example, a distance of approximately 10 meters. However, since traffic warning beacons are always much more closely spaced in curved areas and near the beginning of the construction site, for example, it is usually preferable for the intervals to be shorter, with not every contact area having to be used.

The electrical connection of external functional devices, such as the warning beacons described above, is only one possible use of the conductive carriageway marking. It is also possible to directly place function elements on the carriageway marking, making use of the contact areas. Such functional elements can also be, for example, light sources. In road construction, similar elements such as so-called cats' eyes with reflectors, are already known. Using the electrically conductive carriageway marking, these can now be designed as active light sources. In connection with a control line, lighting effects can also be achieved, for example in the form of a travelling light running in the direction of travel.

If light-emitting diodes are used as the light source, the color can also be changed, and an appropriate signal can be provided via the control line or modulated onto the phase connection. This applies to function elements both directly mounted on the carriageway marking and in the case of external devices.

For another example, a signal cable running perpendicular to the carriageway may be connected to the contact area, and this cable can detect the crossing and the direction of travel. For this purpose, for example, two line-shaped pressure sensors can be provided running very close to each other and perpendicular to the carriageway, wherein the sequence of the signal increase can then be evaluated to determine which direction a car is driving. The connection of these line-shaped sensors, which can be made of piezo-films, for example, is made via a function element, which is a control unit that is able to evaluate the signals and forward the result to a central control unit via a signal conductor. Alternatively, this function element can also be the central control unit itself, so that the forwarding becomes redundant. For example, if the evaluation reveals that a vehicle is driving on a highway in the wrong direction, downstream lighting elements, as described above, can then flash red using light emitting diodes to indicate the error to the driver. An alarm can also be triggered via the data link. Issuing a warning to other motorists is also possible using lighting elements.

Likewise, using suitable sensors, such as the transverse pressure sensors described above, the current speed of the vehicles moving on a road can be measured. If this measurement reveals that the vehicles are moving unusually slowly, a traffic jam can be inferred, which can be indicated to the following traffic using remote lighting elements.

If, for example, the carriageway marking is laid along a highway, then by means of pressure sensors running perpendicular to the highway that are installed in pairs relatively close to each other, the current speed of flowing traffic can be measured. If this speed falls below a specified minimum level, the function element located on the carriageway marking in the region of the contact areas can detect this critical condition using a built-in logic, and forward it to a central control unit via a data line integrated in the carriageway marking. This can use further sensors to determine where the end of the traffic jam is located.

One way in which the findings relating to the road occupancy obtained in this way can be used is to warn the following traffic of the impending congestion using lighting elements, either external ones or those located on the carriageway marking. For this purpose, for example, flashing lights can be provided on the contact area in the event of an alarm. If these lamps are light-emitting diodes, then the color can also be adjusted, so that at a good distance from the congestion the lights flash amber, and on approaching closer a red color is then selected. Also, using the flashing frequency a critical condition can be conveyed in a striking manner. A further advantage of determining the current road occupancy is the fact that the data thus captured can be automatically transmitted to the traffic monitoring services and broadcasting stations.

When the carriageway marking is used for transmitting data, data processing devices can also be connected via the contact areas. These can be distributed at certain intervals along the carriageway and evaluate the measured data, and relay it via data lines within the carriageway marking. In the same way, temperature measuring devices can also be connected to warn drivers of impending icy conditions. The same applies to wind measuring devices, which can be placed for example in the bridge section next to the highway and the signals of which can be relayed via the data line of the carriageway marking. Even warning of deer crossing is also possible using thermal imaging cameras.

If light-emitting diodes with low power consumption are used as the lighting means, the electrically conductive carriageway markings can be used at low cost. It is advantageous if the carriageway marking provides phase and neutral conductors and additionally has at least one data line, via which different lighting means connected to the power supply thus provided can be controlled. In this way, not only the traffic warning beacons previously described, but also orientation lights and even traffic lights can be controlled.

Another possible application of the carriageway marking is as a departure warning system. While vehicles with departure warning systems currently detect the carriageway markings visually, by providing a current-carrying conductor in the carriageway marking it is possible to detect the approach of a vehicle to this conductor electrically, such as inductively. The sensor technology necessary for this is not only more reliable but is also effective when the carriageway marking is covered, for example by snow or foliage. Furthermore, the detection of the carriageway marking can thus be performed in a cost-effective way. A vehicle may be equipped with a lane departure warning system and detection means, which are able to detect a current-carrying conductor in the carriageway marking and to calculate the distance between the carriageway marking and the vehicle. This includes the carriageway marking with the current-carrying conductor.

DETAILED DESCRIPTION

Figure 1:
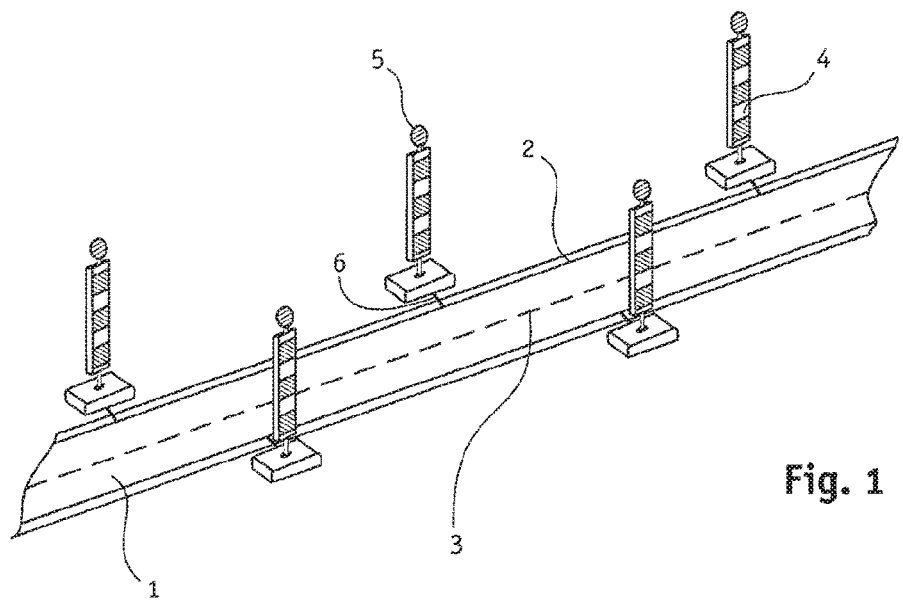
FIG. 1 is a perspective view of an example carriageway.

FIG. 1 shows a carriageway 1 of a road with a carriageway marking 2, shown schematically by way of example. In this case it is a road in the area of a construction site. On both sides of the carriageway 1, warning beacons 4 are set up at whose upper ends lighting elements 5 are arranged. The warning beacons 4 in use today are usually illuminated by battery-powered lamps, which have the disadvantage that the upper end is relatively heavy, which means collisions with passing vehicles can have serious consequences.

Figure 2:
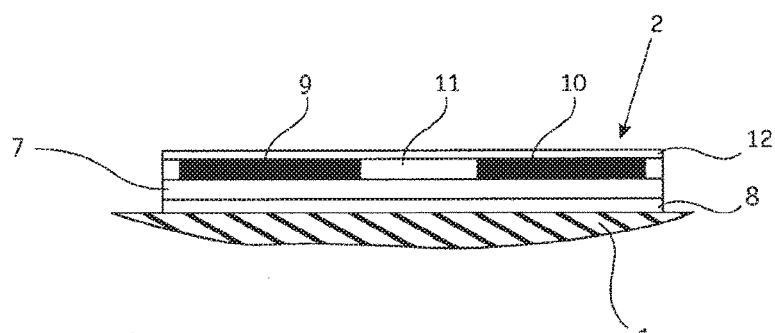
FIG. 2 is a cross-sectional view of a carriageway marking of the carriageway.

The carriageway marking 2 allows batteries to be dispensed with by using the power supply via a supply line 6. A suitable carriageway marking 2 for this purpose is shown in FIG. 2 in a sectional view shown in cross section. In FIG. 2 the usual dashed representation of the cut surfaces has been deliberately omitted, in order to be able to better represent the individual layers. The carriageway marking 2 is glued to a carriageway 1 using an adhesive layer 8. It consists of a carrier strip 7, which runs along the edges of the carriageway 1.

In the drawings, for clarity of illustration the carriageway marking 2 is shown thicker than it will be in most cases. The carriageway marking 2 preferably has a film-like structure and has a thickness of less than 5 mm, and edges of the carriageway marking 2 can be rounded off. The thickness may be 2 mm or less, so that like the already known construction site markings the carriageway marking 2 can be glued onto the carriageway 1 as a flat, thin strip. The carriageway marking 2 may be elastically constructed.

A first wire 9 and a second wire 10 are applied to the carriageway 7 as flat conductor tracks. These may be implemented, for example, as film sheets or as a printed, conductive layer. Between the wires 9, 10, which act as conductor tracks, an insulation layer 11 may be provided or may be omitted. Also, an insulation layer is arranged on both side edges, both of which laterally cover the wires 9, 10 to the outside. On the intermediate layer thus formed, a covering layer 12 is provided, which may be reflective. This results in a carriageway marking that can also be used as a conductor track.

Figure 3:
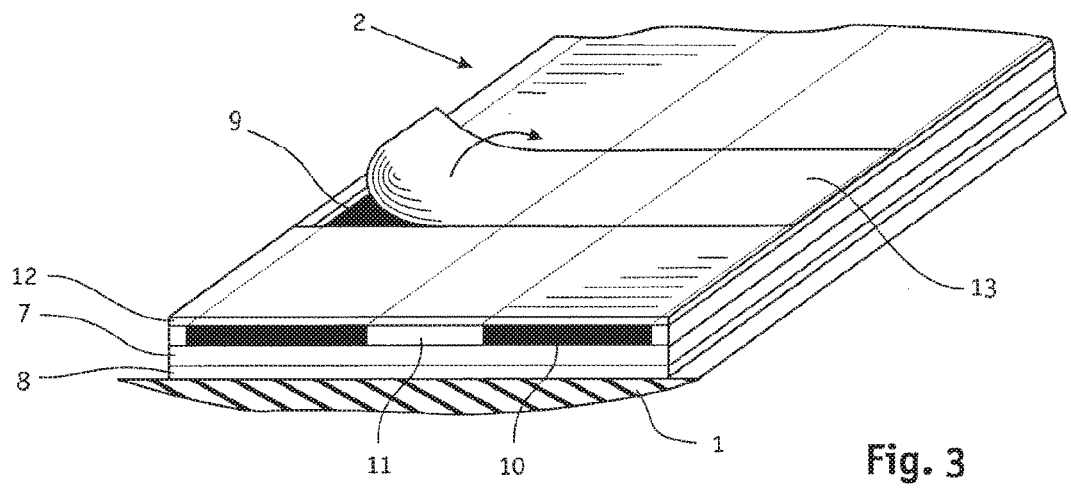
FIG. 3 is a perspective view of a contacting area of the carriageway marking.

So that the supply lines 6 can then be connected to the wires 9, 10, contact areas are provided. These contact areas are shown in FIG. 3. To form the contact area, the covering layer has a protective strip 13 connected to the adjoining edges via perforations. This can then be removed if the contact area is required, thereby exposing the underlying wires 9, 10. The supply line 6 or any other function element can now be connected to this.

Figure 4:
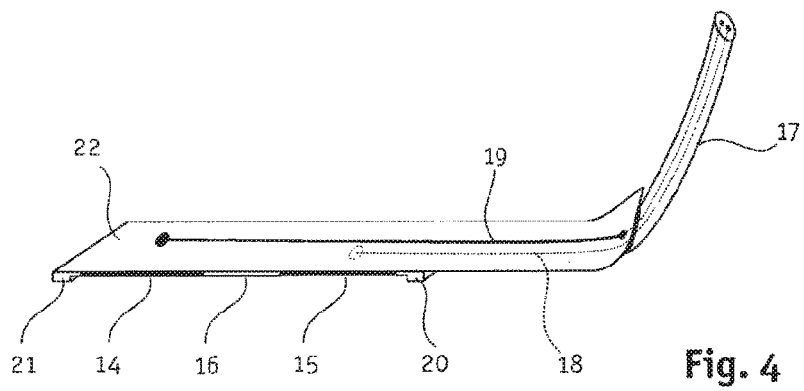
FIG. 4 is a perspective view of a contact element for contacting to the carriageway marking.

The connection to the wires 9, 10 is made, for example, via a contact element 22. Such a contact element 22 is illustrated in FIG. 4. It includes a covering strip, which covers the gap left by removing the protective strip 13. The covering strip can also overlap the covering layer on both edges to provide a better seal.

Conductor tracks are introduced into the covering strips as contacts 18, 19, which connect a first contact area 14 and a second contact area 15 on the underside of the contact element to a supply line 10. The contact areas 14,19 in turn abut against the wires 9,10 if the contact element 22 is glued to the lower part of the carriageway marking 2 in the contact area. The contact 18 is provided on the underside of the covering strip and the contact 19 on its upper side, wherein the contact 19 is then connected to the first contact area through the covering strip. A cover, not shown here, insulates the covering strip against the environment.

The contact element 22 has a first centering element 20 on the right-hand edge and a second centering element 21 on the left-hand edge of the carriageway marking 2 as a positioning aid. These are small elements which project downwards, so that during assembly the correct position must be adopted in the transverse direction if the two centering elements located on the right and left are to grasp the insulating layers on the edges of the carriageway marking 2. At the same time, one of the two centering elements can be used as a fixed point to securely bond the contact element 22 with the layer of the carriageway marking 2 located underneath it.

Figure 5:
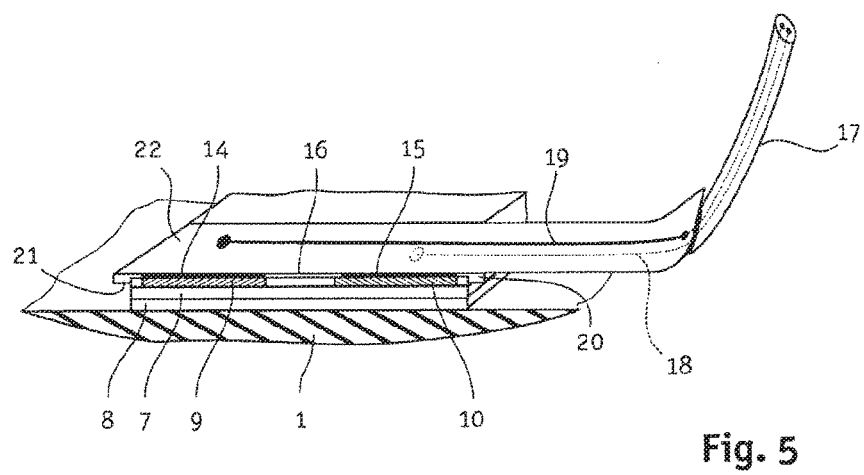
FIG. 5 is a perspective view of the carriageway marking with the attached contact element.

FIG. 5 shows the assembled condition of the contact element 22 of FIG. 4. The two centering elements 20, 21 on the right and left of the insulating layers rest on the edges of the carriageway marking 2. The contact areas 14,15 are located above the wires 9,10 and thus implement the electrical connection.

Figure 6:
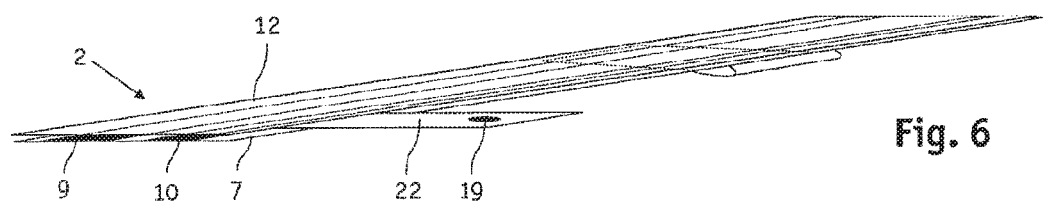
FIG. 6 is a perspective view of another example carriageway marking.
Figure 7:
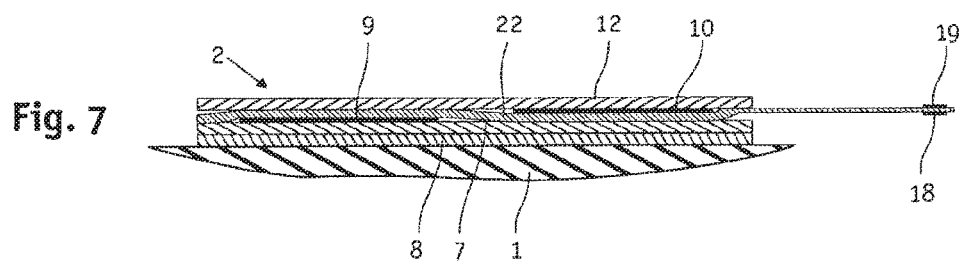
FIG. 7 is a cross-sectional view of the carriageway marking shown in FIG. 6.

With reference to FIG. 6, a carriageway marking 2 has a carrier layer 7, on which a first wire 9 and a second wire 10 are arranged in the form of film-like conductors. The conductor tracks need not be film-like; standard stranded wires, solid copper leads or twisted pairs of wires can also be used here. Here, too, a cover layer 12 is arranged above the wires 9,10. FIG. 7 shows this structure in a cross-sectional view.

Instead of the contact elements 22 shown in FIGS. 4 and 5, in the configuration in accordance with FIGS. 6 and 7 a contact element 22 is used, which protrudes from the side of the carriageway marking 2. This contact element 22 has at its end the region, which is not visible here, for contacting to the second contact area 18 as well as the region for contacting to the first contact area 19. The contact element 22 extends into the carriageway marking 2 between the carrier layer 7 and the covering layer 12.

In the above example, the contact element 22 extends underneath the wire 10 and above the wire 9. However, this is for illustration purposes only. The contact element 22 is electrically connected via the first contact area 14 not visible here to the core 9, and via the second contact area 15, also not visible here, to the wire 10. To this end, it can be provided with exposed, electrically conductive contact areas, for example, with respect to the wire 9 on its underside or with respect to the wire 10 on its top, which abut against the first contact area 14 and the second contact area 15, which are then also exposed with respect to these contact areas.

The region of the contact element 22 protruding laterally outwards is preferably, but not necessarily, flexible. It can be passed into a connection cable, which can have a plug or a socket for connecting electrical consumers or sensors. Other interfaces are, of course, also possible, such as plugs or sockets known from data communication technology. Pulsed signals for switching on, off, or between operating states, and other signals as well, can also be transmitted by contactless means, for example via induction.

The contact elements 22 as they are shown in FIGS. 6 and 7 are preferably spaced apart from each other along the carriageway marking 2. The contact area 18,19 is preferably electrically insulated in such a way that this insulation can be removed for connecting electrical consumers. If the outwardly protruding region of the contact element 22 passes into a cable, a socket or a plug connector, then this is of course not absolutely necessary.

With reference to FIG. 6, the contact element 22 is placed flat on the carriageway 1 (not shown here) in the frontal section, so that the electrical consumer can be connected via the contact areas 19 and (not visible) 18. In the rear section, a contacting element 22 is apparent, which has been passivated. To this end, before gluing the carriageway marking 2 to the carriageway 1 (not shown), this contacting element was folded down and is now located inside the adhesive layer 8 (not shown), which fixes the carriageway marking 2 on the carriageway 1. The contact areas 18,19 can be electrically insulated by the adhesive layer or else by covering means that are either present from the outset or separately applied covers.

The design of the carriageway marking 2 of FIG. 6 allows only those contact elements 22 to be used that are required for connecting consumers. On the other hand, the contact element 22 need not be additionally mounted, simplifying the assembly of the carriageway marking 2. The folding over, and the gluing of the folded areas of the contact element 22, as shown in the rear part of FIG. 6, is also not absolutely necessary but it prevents unneeded parts of the contact element 22 from protruding laterally from the carriageway marking 2 as free terminal lugs and then being torn off, perhaps by a snow-plow.

Of course, the examples according to FIG. 4 or 5 and FIG. 6 or 7 can also be combined with one another, so that, for example, additional contacts can still be made retrospectively. The two connection options shown are also only to be understood as examples, and ultimately all other types of connection with cables routed out to the side, a direct contact with the carriageway marking 2, or else a lateral tapping of the 1st contact area 14 and in the 2nd contact area 15, which is then exposed at the side, can be implemented.

The number of wires 9,10 is not essential. In addition, the wires 9,10 can be current-carrying conductors, but data can also be transferred over the wires 9,10. A data transfer can also take place in addition to the current transport through a wire 9,10, wherein for example the data signal is then modulated onto the AC voltage used as a carrier frequency.

Alternatively, a separate data line can also be used, wherein the wires 9,10 need not be identical either. Thus, for example, as a current-carrying wire 9,10 a flat, conductive film can be used, while twisted stranded wires (known as twisted pair), as are known from data communications technology, can be used for data transmission. The wires 9,10 can be shielded using additional insulators or insulation layers in order to prevent interference effects from traffic or signaling devices.

LIST OF REFERENCE NUMERALS

1 carriageway
2 carriageway marking
3 central strip
4 warning beacon
5 lighting element
6 supply line
7 carrier strip
8 adhesive layer
9 wire
10 wire
11 insulation layer
12 covering layer
13 protective strip
14 first contact area
15 second contact area
16 insulation area
17 connecting cable
18 contact of second contact area
19 contact of first contact area
20 first centering element
21 second centering element
22 contact element

The invention claimed is:
1. A road comprising:
at least one carriageway;
an electrically conductive carriageway marking including
  a carrier strip;
  at least two electrically conductive wires extending along the carrier strip, wherein at least one of the wires is a data transmitting wire;
  an electrically insulating covering layer covering the wires;
  at least one power feed formed by an interface for feeding in current and/or data and connecting the wires to a supply line; and
  interfaces arranged spaced apart from each other along the carriageway marking and having electrical contact areas, via which electrical components are connectable to at least one of the wires;

wherein the contact areas are configured such that one of
(A) the contact areas include contact elements protruding laterally from the carriageway marking; and
the supply line is connectable to a first contact area of the wires and a second contact area of the wires by electrical contacts that can be tapped off; and
(B) in the region of the contact areas the covering layer is formed by a detachable adhesive protective strip;
the detachable adhesive protective strip is connected via predetermined break points or perforations to adjoining sections of the covering layer; and
the wires are arranged on the carrier strip such that the wires are exposed by detaching the protective strip;
at least one processor connected to the carriageway marking; and
sensors connected to the carriageway marking via the contact areas, wherein the sensors are able to supply data about the contact areas of the carriageway marking or to read data therefrom.

2. The road as claimed in claim 1, further comprising lights connected to the carriageway marking one behind the other, wherein the lights include light-emitting diodes, and the lights are configured to control one of a color and a flash frequency of the light-emitting diodes based on control signals transmitted via the data transmitting wire from the processor.

3. The road as claimed in claim 1, wherein the sensors are one of pressure sensors arranged one behind the other in a transverse direction across the carriageway for speed measurement, temperature sensors, illumination sensors, heat sensors for detecting wild animals, and wind strength sensors.

4. An electrically conductive carriageway marking comprising:
a carrier strip;
at least two electrically conductive wires extending along the carrier strip;
an electrically insulating covering layer covering the wires;
at least one power feed formed by an interface for feeding in current and/or data and connecting the wires to a supply line; and
interfaces arranged spaced apart from each other along the carriageway marking and having electrical contact areas, via which electrical components are connectable to at least one of the wires;
wherein the contact areas are configured such that one of
(A) the contact areas include contact elements protruding laterally from the carriageway marking; and
the supply line is connectable to a first contact area of the wires and a second contact area of the wires by electrical contacts that can be tapped off; and
(B) in the region of the contact areas the covering layer is formed by a detachable adhesive protective strip;
the detachable adhesive protective strip is connected via predetermined break points or perforations to adjoining sections of the covering layer; and
the wires are arranged on the carrier strip such that the wires are exposed by detaching the protective strip.

5. The electrically conductive carriageway marking as claimed in claim 4, wherein at least one of the wires is a data line.

6. The electrically conductive carriageway marking as claimed in claim 4, wherein at least one wire is a current carrying phase and one wire is implemented as a neutral conductor.

7. The electrically conductive carriageway marking as claimed in claim 4, wherein the electrical components are electrical devices, lighting elements, or sensors.

8. The electrically conductive carriageway marking as claimed in claim 4, wherein the wires are arranged next to each other on the carrier strip extending along the carrier strip; the covering layer includes sections which are detachably connected to the carriageway marking; and at least one of the wires can be at least partially exposed for contacting in the region of the contact area by partial removal of the covering layer.

9. The electrically conductive carriageway marking as claimed in claim 4, wherein the carriageway marking has a film-like design and has a thickness of less than 5 mm.

10. The electrically conductive carriageway marking as claimed in claim 4, further comprising at least one of the contact elements, and a connection lead connected to the first contact area and to the second contact area such that, after removal of the protective strip, the first contact area comes into electrical contact with a first of the wires and the second contact area comes into electrical contact with a second of the wires.

11. The electrically conductive carriageway marking as claimed in claim 4, further comprising a lighting element mountable on the contact areas as an alternative to the contact element, wherein the lighting element connects a light source arranged on the lighting element to the wires.

12. The electrically conductive carriageway marking as claimed in claim 4, further comprising a function element mountable on the contact areas as an alternative to the contact element, wherein the function element includes a sensor sensitive to at least one environment variable, and the sensor is one of a temperature sensor, a vibration sensor, a fog sensor, a contact sensor, and a weight sensor, the electrically conductive carriageway marking further comprising a controller able to evaluate a sensor signal from the sensor and convert the sensor signal into a data signal.

13. The electrically conductive carriageway marking as claimed in claim 4, wherein the wires include a first wire and a second wire, the electrically conductive carriageway further comprising at least one additional wire arranged next to the first wire and the second wire, and a contact element, wherein a first configuration of the contact element connects the first wire and the second wire to a connection lead, and a second configuration of the contact element connects the additional wire and one of the first wire and the second wire to the connection lead.

14. The electrically conductive carriageway marking as claimed claim 10, wherein the contact elements include a top surface with the same composition as the covering layer and are adhesively designed at least outside of the first contact area and of the second contact area for bonding onto the underside thereof.

15. The electrically conductive carriageway marking as claimed in claim 4, further comprising an insulation layer arranged between the wires, wherein the covering layer is light-reflecting.

16. The electrically conductive carriageway marking as claimed in claim 15, further comprising at least one additional wire, wherein the contact element comes into electrical contact with the additional wire and is able to contact a connection lead via the additional wire.

* * * * *